(12) United States Patent
Merchant

(10) Patent No.: US 6,460,088 B1
(45) Date of Patent: Oct. 1, 2002

(54) METHOD AND APPARATUS FOR PORT VECTOR DETERMINATION AT EGRESS

(75) Inventor: Shashank C. Merchant, Sunnyvale, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/316,073

(22) Filed: May 21, 1999

(51) Int. Cl.[7] ............................................... G06F 15/16
(52) U.S. Cl. ........................................ 709/236; 370/356
(58) Field of Search ................................ 370/315, 356, 370/396, 389, 254, 354, 398; 710/107, 163; 711/137, 159; 709/219, 232, 231, 238

(56) References Cited

U.S. PATENT DOCUMENTS

| | | | | |
|---|---|---|---|---|
| 5,825,772 A | * | 10/1998 | Dobbins et al. | ............ 370/396 |
| 5,892,912 A | * | 4/1999 | Suzuki et al. | ................ 709/218 |
| 6,151,316 A | * | 11/2000 | Crayford et al. | ............. 370/356 |
| 6,157,623 A | * | 12/2000 | Kernstein | .................... 370/315 |
| 6,249,521 B1 | * | 6/2001 | Kernstein | .................... 370/389 |
| 6,259,699 B1 | * | 6/2001 | Opalka et al. | .............. 370/398 |

* cited by examiner

*Primary Examiner*—Dung C. Dinh
*Assistant Examiner*—Kimberly Flynn

(57) ABSTRACT

An integrated multiport switch operating in a packet switched network provides the capability to alter VLAN tags on a port by port basis. An internal rules checker (IRC) employs a modular architecture that enables data frames to be processed simultaneously and increase data throughput. The IRC further generates a port vector, and thereby, outputs a forwarding descriptor that instructs Port Vector FIFO logic (PVF) on how to process the data frame.

16 Claims, 8 Drawing Sheets

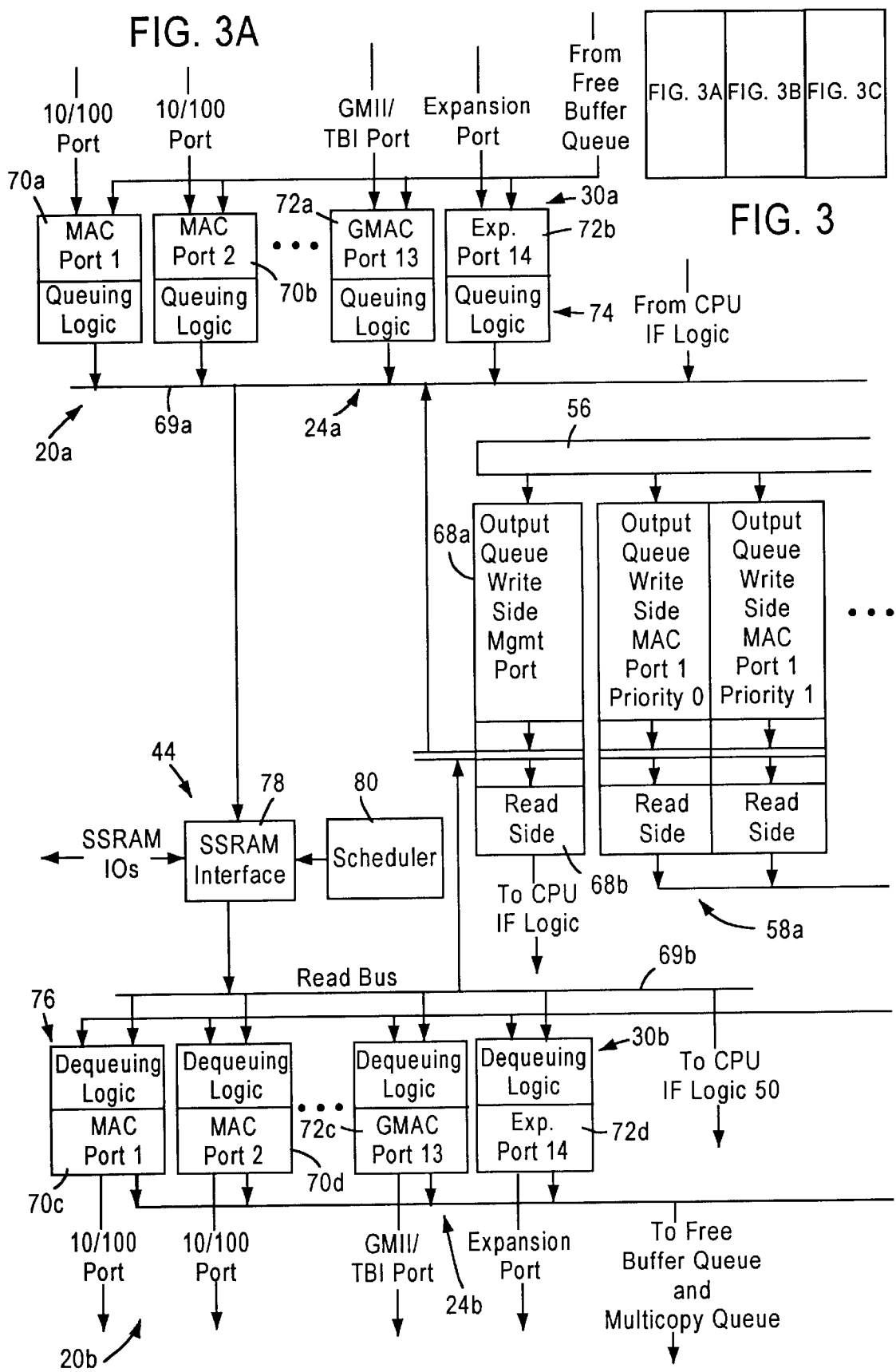

METHOD AND APPARATUS FOR PORT VECTOR DETERMINATION AT EGRESS

BACKGROUND OF THE INVENTION

1. Technical Field

The present invention relates to data communication networking devices, more particularly, to the data frame forwarding capability of a data network switch.

2. Background Art

A multiport data network switch conventionally permits data communication among a plurality of media stations in a local area network. Each station in the network is associated with a port of the switch. Data frames, or packets, are transferred between stations by means of data network switch media access control (MAC) circuitry, or "engines," for each switch port. The network switch passes data frames received from a transmitting station to a destination station based on the header information in the received data frame. The switch can link the network to other networks through one or more predesignated switch ports. The capability thus exists for creating logical workgroups of users who may be physically separated from each other. The network switch includes switching logic for receiving and forwarding frames to the appropriate destinations. When all of the stations connected to the network are simultaneously operating, packet traffic on the shared path can be heavy with little time between packets. As the switch experiences congestion, data loss and switch latency pose a serious problem.

As a result, the system is less reliable.

SUMMARY OF THE INVENTION

There exists a need for a switching device that efficiently generates frame forwarding information for various types of data transmissions in a VLAN environment. There exists a need for a switching device that includes a decision making engine designed to support networks requiring a high data throughput. There is also a need for a switching device that employs a modular decision making engine that facilitates changes to the decision making logic. There is also a need for distributing the process of forwarding data frames to avoid processing bottlenecks in the system and to increase system reliability.

These and other needs are satisfied by the present invention, where a multiport switch includes a decision making engine used to make frame forwarding decisions, in part, by outputting forwarding information. The decision making engine is a designed in a pipelined, modular fashion so that multiple frames may be processed simultaneously.

According to one aspect of the present invention, a multiport switch is configured for processing a data frame. The multiport switch comprises a plurality of ports for outputting the data frame. The switch also includes a rules checker logic for generating, in a pipeline manner, a forwarding descriptor. The rules checker logic includes a destination address engine for outputting a port vector that selectively maps a destination address of the data frame to one or more of the ports. Moreover, the rules checker logic is configured to modify the port vector to output the forwarding descriptor. The forwarding descriptor contains the modified port vector. Because the rules checker logic possesses a modular, pipelined architecture, the data frame forwarding rate is enhanced.

Still another aspect of the present invention provides a method of forwarding a data frame in a switching system having a plurality of ports for outputting the data frame. The method comprises generating a port vector based upon a destination address of the data frame. The port vector designates one or more of the plurality of ports to output the data frame. The method also includes modifying the port vector to selectively add or remove port designations. Ultimately, a forwarding descriptor is output in a pipeline manner. This method advantageously outputs a forwarding descriptor efficiently, thereby increasing the data throughput of the multiport switch.

Additional advantages and novel features of the invention will be set forth in part in the description which follows, and in part may become apparent to those skilled in the art upon examination of the following or may be learned by practice of the invention. The advantages of the invention may be realized and attained by means of the instrumentalities and combinations particularly pointed out in the appended claims.

DETAILED DESCRIPTION OF ILLUSTRATIVE EMBODIMENTS

The present invention will be described with the example of a switch operating in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
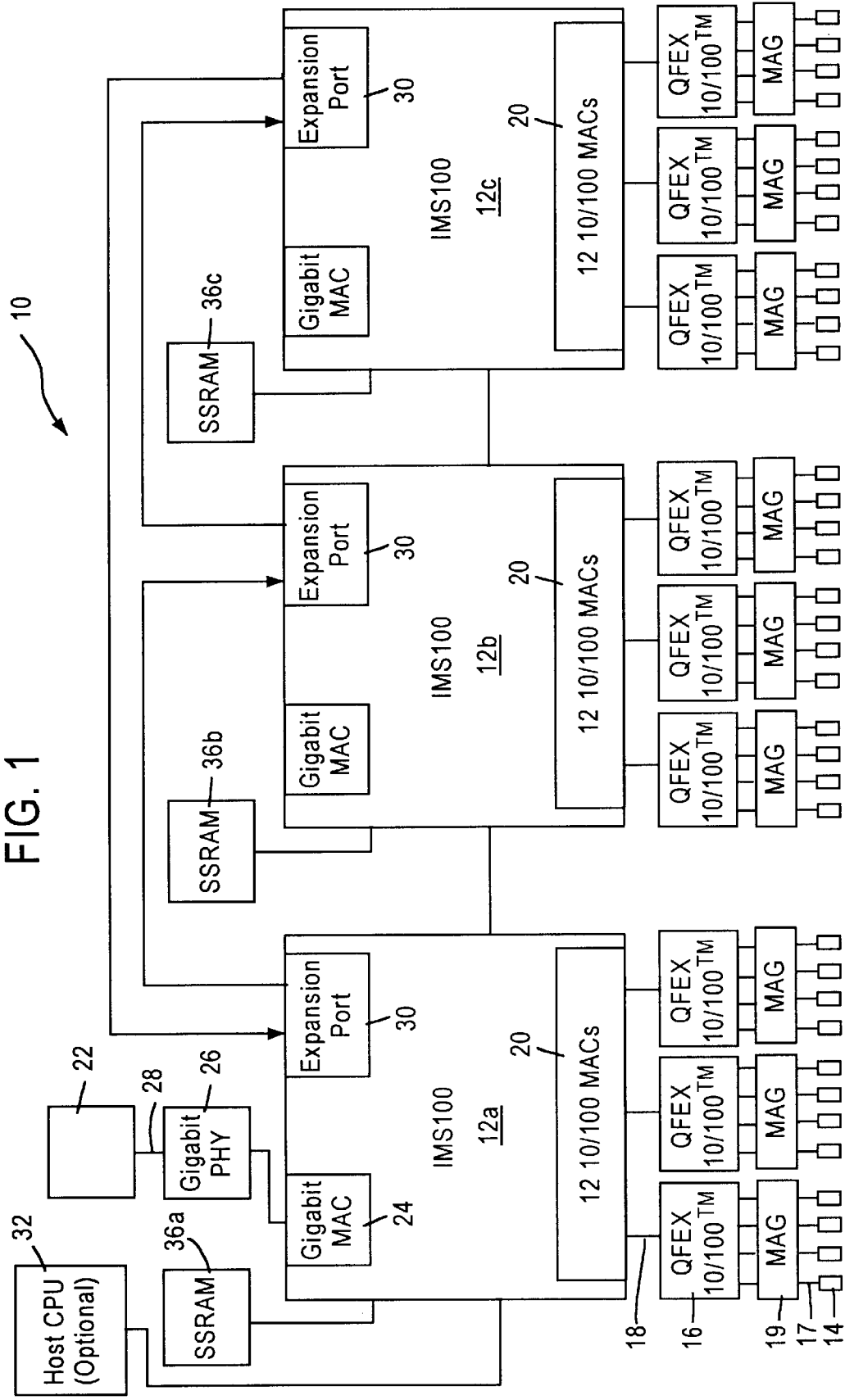
FIG. 1 is a block diagram of a packet switched network including a multiple port switch.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a twoway, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Figure 2:
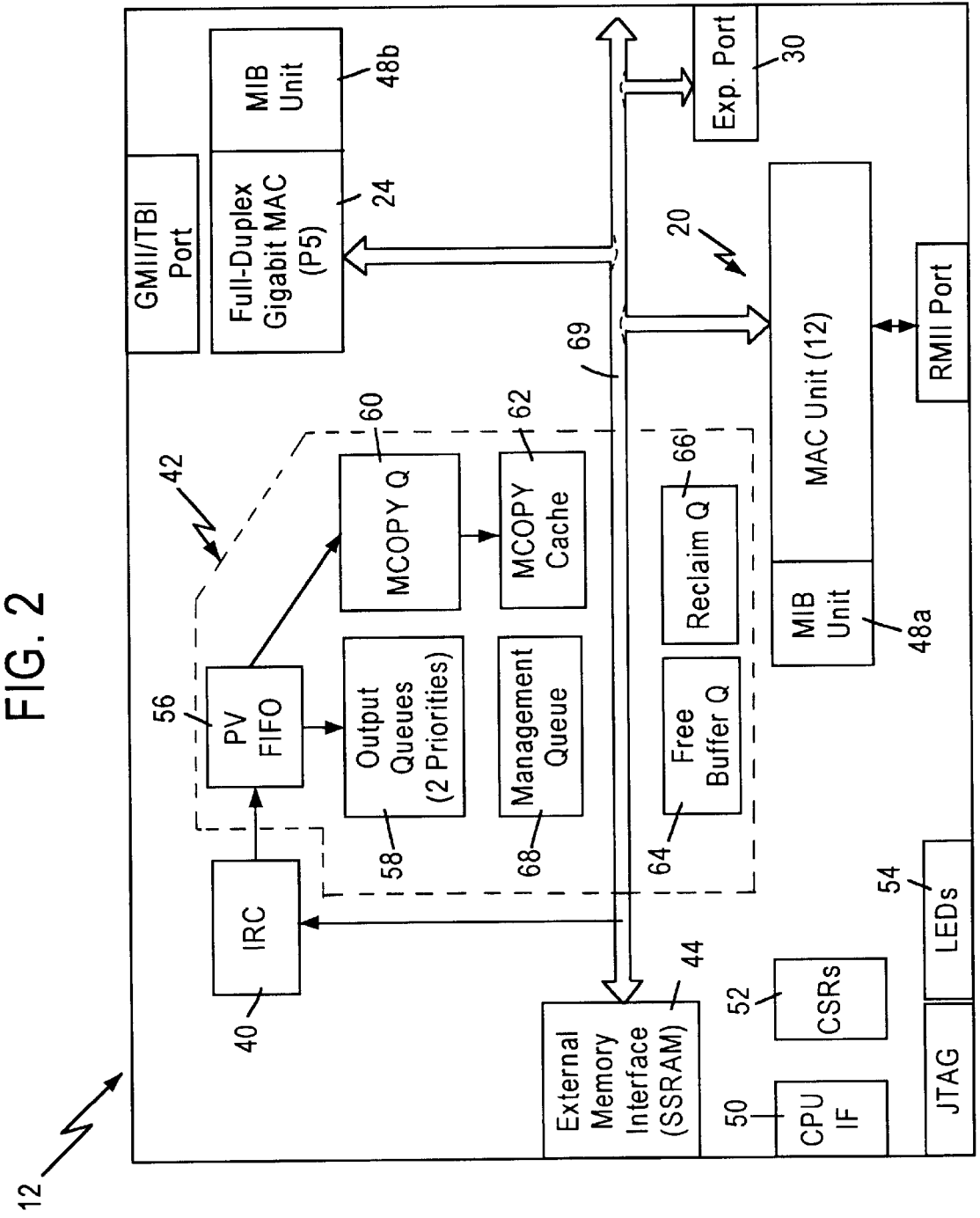
FIG. 2 is a block diagram of the multiple port switch of FIG. 1.

Each multiport switch 12 also includes an expansion port 30 for transferring data between other switches according to a prescribed protocol. Each expansion port 30 enables multiple multiport switches 12 to be cascaded together as a separate backbone network FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port 2, based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3B:
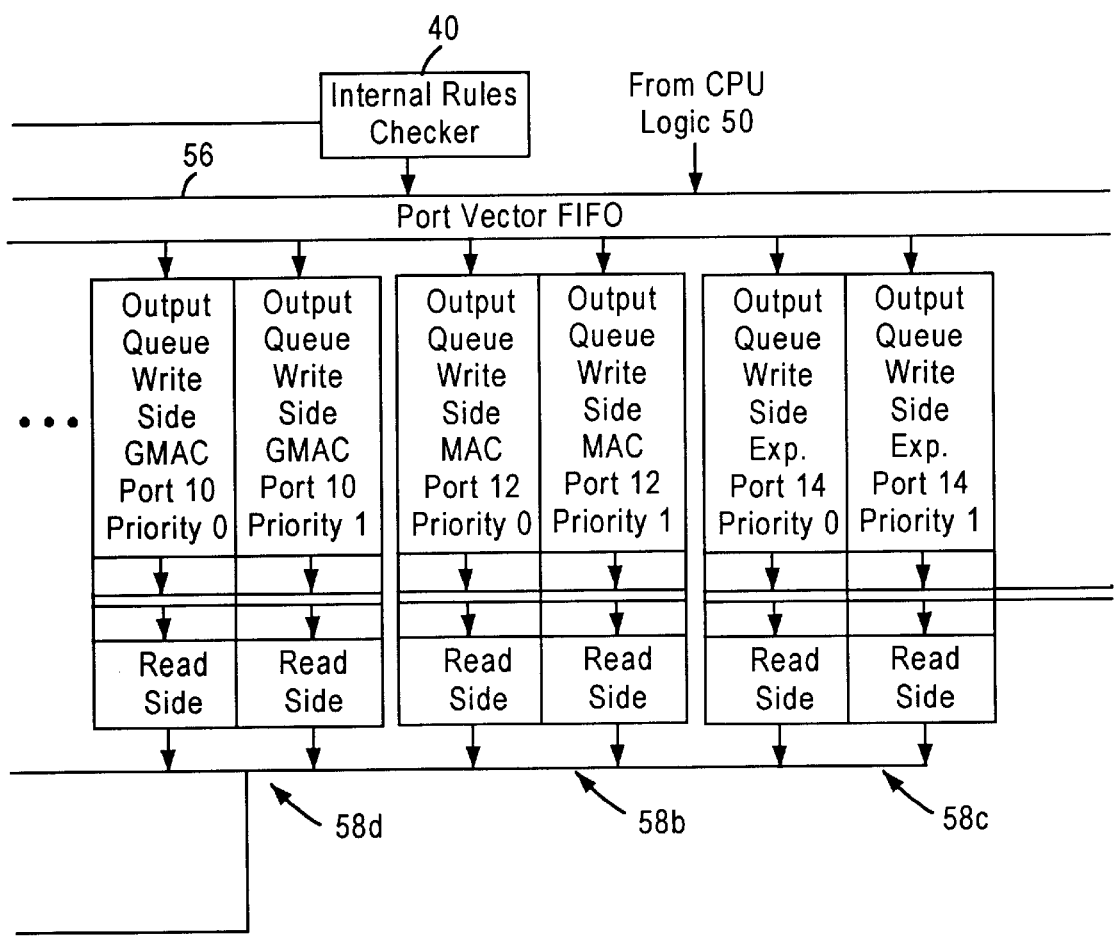
FIG. 3 is a block diagram illustrating in detail the switching subsystem of FIG. 2.
Figure 3C:
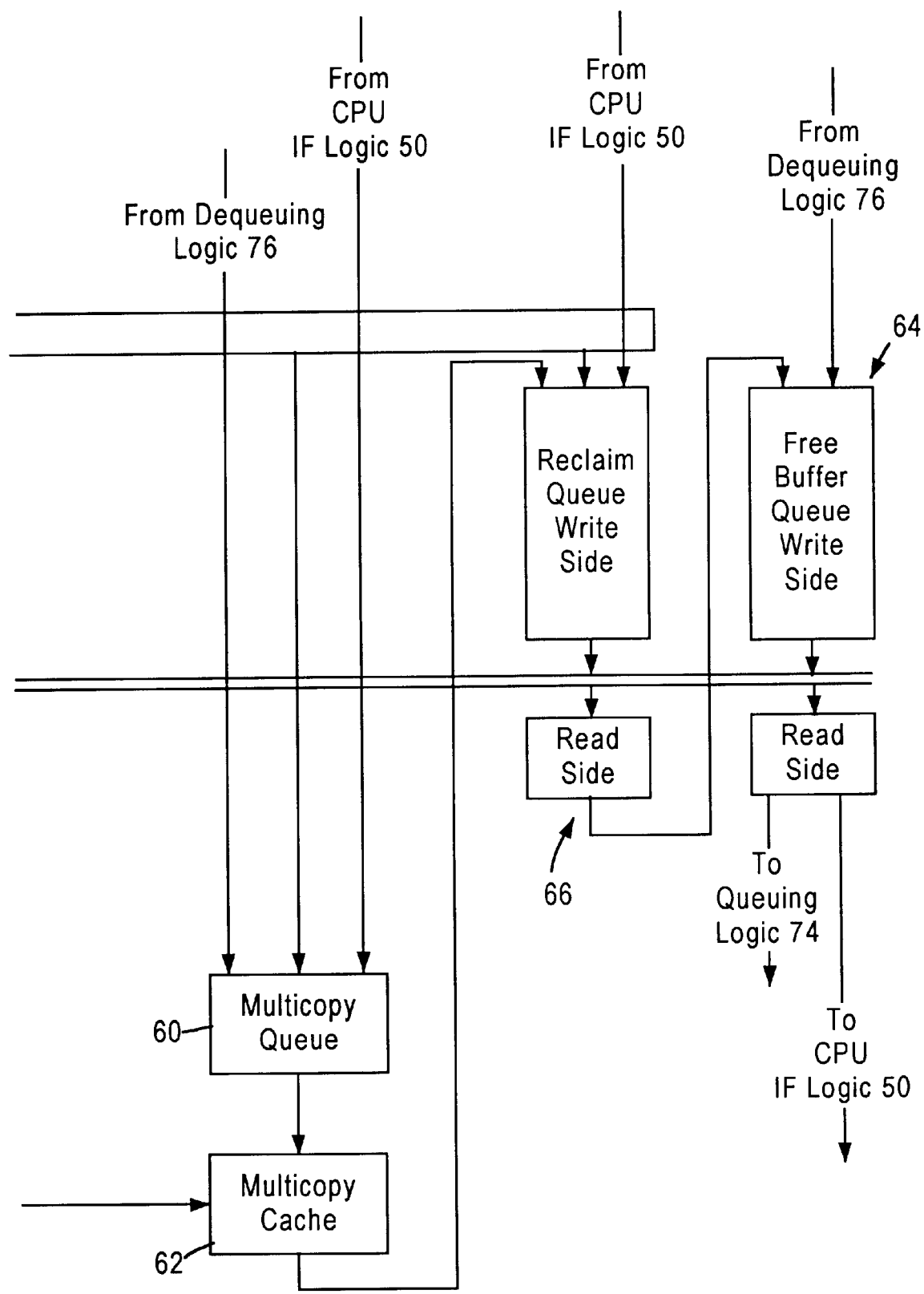

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the architecture of an exemplary expansion port 30 will be discussed, followed by the details for transferring data between switches 12.

Generation of the Forwarding Descriptor

The present invention is directed to a network switch with capability to support VLANs through the use of an internal rules checker 40 (IRC) to provide high data throughput. As described previously, the switch subsystem 42 provides the switching logic for receiving and forwarding frames to the appropriate output port(s). The forwarding decisions, however, are made by the IRC 40 located on the multiport switch 12.

As previously indicated with respect to FIG. 3, the IRC 40 is responsible for making frame forwarding decisions, in part, by generating a forwarding descriptor. Towards this end, the IRC 40 contains an address table for MAC addresses (which may be unicast, or multicast ), along with VLAN associations and port vectors. Upon receipt of a frame header from one of its input ports, the IRC 40 searches the address table for matching MAC addresses and learns the network configuration based upon a MAC source address (SA) with receive port number and VLAN lookup. The forwarding decision is then made according to the DA and the VLAN association, resulting ultimately in the output of a forwarding descriptor. The IRC 40 passes the generated forwarding descriptor that includes the frame type and an operational code (opcode) to PVF 56 (FIG. 3). The PVF 56 is responsible for creating a new opcode that instructs the dequeuing logic 76 to add, remove, modify the VLAN tag, or send the frame unmodified. VLANs provide "broadcast domains" whereby broadcast traffic is kept "inside" the VLAN. For example, specific VLAN may contain a group of users at a high level of an organization. When sending data to this group of users, the data may include a specific VLAN identifier associated with this particular group to ensure that only these users receive the data.

Figure 4:
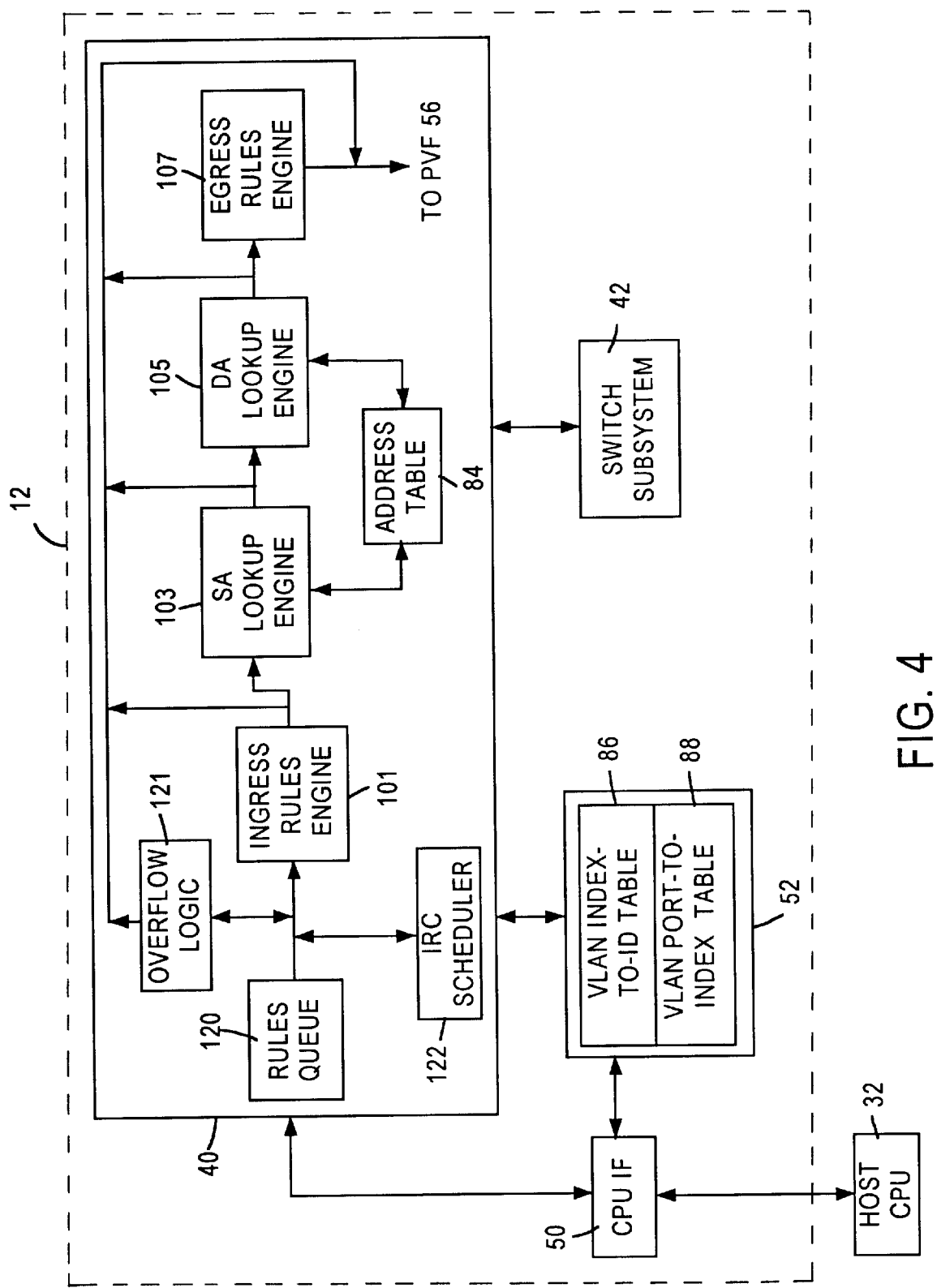
FIG. 4 is a block diagram of a system including the internal rules checker (IRC) of FIG. 2 in accordance with an embodiment of the present invention.

According to the exemplary embodiment of the invention illustrated in FIG. 4, the IRC 40 includes four functional logic blocks, namely an ingress rules engine 101, a source address (SA) lookup engine 103, a destination address (DA) lookup engine 105, and an egress rules engine 107. In the exemplary embodiment, the four engines 101, 103, 105, and 107 are employed as separate logic devices. In other words, each engine is designed in a modular fashion to receive input from other devices and to perform its particular functions without relying on processing logic from another logic engine. Advantageously, this modular architecture allows changes to be made to any of the particular logic engines without affecting other parts of the decision making process. However, in alternative configurations, the individual functions performed by each logic engine, discussed in detail below, as well as the particular number of logic engines may be modified, based on the particular network requirements.

The IRC 40 also includes address table 84. In alternative embodiments, the address table 84 may be located outside the IRC 40 within another part of the multiport switch 12 or even external to the multiport switch 12. However, in the exemplary embodiment, the address table 84 is located within the IRC 40 and is coupled to the SA lookup engine 103 and the DA lookup engine 105. According to this exemplary embodiment, the address table 84 supports 4096 user addresses and capabilities for 64 unique VLANs. However, the number of addresses and VLANs supported may be increased by expanding the table size.

As shown in FIG. 4, the host CPU 32 functions as the management entity and is connected to the IRC 40 via the CPU interface (IF) 50. Alternatively, a management MAC may be connected to the CPU IF 50 to function as the management entity. The CPU IF 50 allows the host CPU 32, among other functions, to directly access the configuration and status registers 52 and permits communication between the IRC 40 and the host CPU 32. The IRC 40 is responsible for initializing the values in the address table 84. The IRC 40 uses the specific fields of the address table 84 to make frame forwarding decisions when frames are received in the switch 12. More specifically, the DA lookup engine 105 searches the address table 84 for frame forwarding information. From the information found in the address table 84, the IRC 40 creates a forwarding descriptor, which includes the frame pointer, the forwarding port vector, the receive port number, the VLAN identifier (ID), the priority class and a control opcode. An exemplary format of the forwarding descriptor is described in FIG. 6. The IRC 40 then transmits the forwarding port vector to the port vector FIFO 56 for queuing, as shown in FIG. 3.

The host CPU 32 is also responsible for programming the 64 12-bit VLAN IDs in the VLAN index to VLAN ID table 86. The host CPU 32 may also assign a port-based VLAN ID to each port. Accordingly, the CPU 32 must program the VLAN Port-to-Index table 88. The IRC 40 uses VLAN Port-to-Index table 88 to assign a VLAN ID to a frame that is received without a VLAN tag.

The VLAN index field is a 6-bit field used to reference a 12-bit VLAN ID. A VLAN index-to-VLAN ID table 86, shown in FIG. 4, contains the mapping associations. The switch 12 receives both tagged and untagged frames. When the switch 12 receives untagged data frames, i.e., without VLAN tag information, the IRC 40 assigns a VLAN index from a VLAN port-to-index table 88, based on the receive port on which the frame is received. The VLAN index-to-ID table 86 and the VLAN port-to-index table 88 are located with the configuration and status registers 52. However, in alternative configurations, the tables 86 and 88 may be located within the IRC 40.

According to the exemplary embodiment, the IRC 40 also includes a logically separate 4-deep rules queue 120 allocated for each receive port, i.e., the queue corresponding to each receive port holds four frame headers. However, in alternative configurations, the rules queue 120 may be configured to store other numbers of frame headers for each port, based on the particular network requirements. The rules queue 120 "snoops" on the write bus 69 to external memory 36 to capture the first 40 bytes of frame data transferred by queuing logic 74 to the buffers in external memory 36. When a frame has been completely transferred to external memory 36, the queuing logic 74 signals the end of the transfer and provides frame status information indicating whether the frame was received at the switch 12 without errors.

The IRC 40 also includes IRC scheduler 122, as shown in FIG. 4, which monitors the signaling from queuing logic 74 and stores the frame status information in the rules queue 120 along with the corresponding frame header. When the end of frame (EOF) transfer has been signaled by the queuing logic 74, the IRC scheduler 122 enables the processing of the frame header through the ingress rules engine 101. Logic engines 101, 103, 105, and 107, as discussed previously, are separate logic devices and are able to process data frames in parallel, thereby increasing data throughput as compared to systems which employ a single decision making device. In other words, each logic engine is able to perform its respective processing on a different data frame simultaneously with the other respective logic engines. Advantageously, the data throughput of the multiport switch 12 including engines 101, 103, 105, and 107 may increase up to fourfold, as compared to a network switch that employs a single decision making device, since four data frames may be processed simultaneously. The operation of each logic engine, according to the exemplary embodiment, will be described below.

When an overflow state of any of the rules queues 120 is detected by the IRC 40, overflow logic 121 allows frame pointers to bypass engines 101, 103, 105, and 107. The overflow logic 121 comprises multiple overflow registers (not shown) that are allocated to different receive ports of the switch 12. For example, overflow registers, designated as registers 1 to 12, may be provided to support 10/100 MAC ports 1–12; overflow register 13 may be arranged for frame pointers associated with data received via the gigabit MAC port 24. Further, overflow register 14 may be assigned to the expansion port 30. Each of the entries of the overflow register is capable of storing a single 13-bit frame pointer associated with data received via the corresponding receive port. The IRC 40, thus, outputs an overflow (OVFL) descriptor based upon the frame pointers that bypassed the engines 101, 103, 105, and 107.

The ingress rules engine 101 performs a variety of pre-processing functions for each frame header. For example, ingress rules engine 101 checks to see if a data frame was received with errors by reading the frame status information stored with the respective frame headers in rules queue 120. When the ingress rules engine 101 determines that a receive error has occurred, the ingress rules engine 101 constructs a forwarding descriptor with a null port vector, e.g., a port vector with all zeros or some other predetermined value, that will cause the frame to be discarded. Optionally, frames with errors may be forwarded to the host CPU 32 for diagnostic purposes. However, in either case, the ingress rules engine 101 transmits the forwarding descriptor with the null port vector directly to the port vector FIFO 56, without processing by engines 103, 105 and 107. Advantageously, this saves processing time associated with performing searches of the address table 84 for a data frame that contains erroneous data.

The ingress rules engine 101 also checks the destination address (DA) of the frame to determine if the frame should be sent to the management entity, e.g., host CPU 32. Specifically, the ingress rules engine 101 looks for Bridge Protocol Data Units (BPDUs), Generic Attribute Registrations Protocol (GARP) frames, MAC Control Frames and frames with certain Physical MAC addresses. The ingress rules engine 101 identifies these types of frames based on their specific destination address information. When the ingress rules engine 101 detects a match with one of the above DAs, the ingress rules engine 101 constructs a forwarding descriptor identifying the management port. The ingress rules engine 101 then transmits the forwarding descriptor directly to the port vector FIFO 56, bypassing engines 103, 105, and 107.

If the SA lookup engine 103 finds an address entry whose address and VLAN index match the SA and VLAN index of the frame. If the SA lookup engine 103 does not find a match and learning is enabled, the SA lookup engine 103 constructs a new entry in the IRC address table 84 using the information from the received frame.

After the SA lookup engine 103 completes the search and adds a new entry, if necessary, the DA lookup engine 105 performs a search of the address table 84. Specifically, the DA lookup engine 105 searches the address table 84 for an address entry whose address and VLAN index match the destination address (DA) and VLAN index of the frame. The DA lookup engine 105, in an exemplary embodiment, uses a 12-bit hash function circuit (not shown) to generate a 12-bit hash key for the DA/VLAN index search. If a match is found, the DA lookup engine 105 uses the port vector field of the address entry and passes the port vector field information to the egress rules engine 107. When the DA lookup engine 105 cannot find a DA/VLAN index match, the frame must be "flooded" to all members of the VLAN. In this case, the DA lookup engine 105 sets the port vector to indicate that all ports are to transmit the frame. The port vector field is a 15-bit field that identifies each port(s) that should receive the data frame for transmission to its destination address. Bit 0 of the port vector field corresponds to Port 0 (the management port), bits 1–12 correspond to MAC ports 1–12 respectively (the 10/100 Mb/s ports), bit 13 corresponds to the gigabit port 24 and bit 14 corresponds to the expansion port 30.

Figure 5:
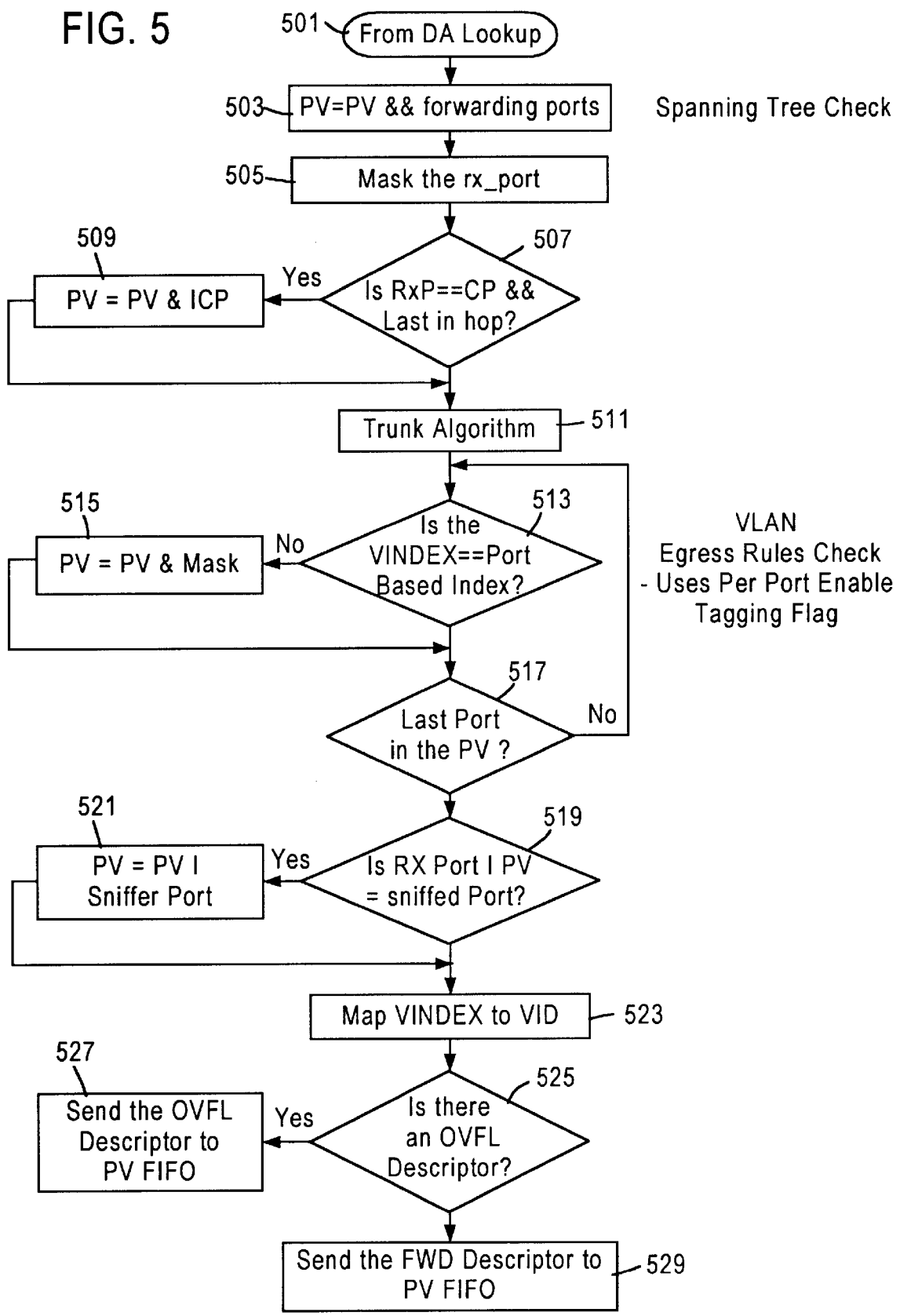
FIG. 5 is a flow diagram of the generation of a forwarding descriptor by the IRC in accordance with an embodiment of the present invention.

FIG. 5 shows a flow diagram of the generation of a forwarding descriptor by the IRC 40 according to the present invention. In general, a port vector undergoes a series of checks that modifies the port vector so that a proper port vector is captured in a forwarding descriptor sent to the PVF 56. These series of checks are performed in a pipelined and concurrent fashion, thereby markedly reducing the number of clock cycles required to generate the forwarding descriptor over a traditional forwarding logic architecture. That is, the IRC 40 ensures that the data frame is sent out from the proper output ports. As in step 501, a port vector is output from the DA lookup engine 105. As previously discussed, the DA lookup engine 105 outputs the port vector, which reflects where the data frame should be transmitted as dictated by the destination address in the header of the data frame. Thus, the port vector begins at this state and is subsequently modified according to other criteria and parameters associated with the proper forwarding of the data frame. In step 503, the egress rules engine 107 checks the spanning tree state to determine whether frames received from the port should be filtered. Spanning tree is an algorithm that removes loops in the network for proper operation. The egress rules engine 107 determines which ports are valid "forwarding" ports, which conform with the spanning tree algorithm (e.g., IEEE 802.1d). Thus, the port vector is accordingly modified to mask out ports that fail the spanning tree check; the port vector is logically "AND" with the determined forwarding ports so as to mask the ports that have been blocked. Next, the received port, as in step 505, is eliminated from the port vector by masking the received port with the port vector. It should be noted that if the received port were part of a trunk group that is eliminated (which is discussed below), complete trunk group is also masked. This masking of the received port prevents the scenario whereby a data frame is received at a particular port and is sent out through that same port.

Steps 507 and 509 mask from the port vector a cascade port (CP) from the port vector to prevent the data frame from unnecessarily circulating among the cascaded switch module configuration (as shown in FIG. 1. In this scenario, a number of switches 12a, 12b, and 12c are cascaded (FIG. 1) via their respective expansion ports 30. In step 507, IRC 40 checks whether the data frame was received at the cascade port (i.e., expansion port) and that the cascade port belongs to a switch 12c that is "last" in the cascaded loop. If this is so, as in step 509, the port vector is masked with the cascaded port.

Next, the IRC 40 checks whether the port vector conforms with the results of a "trunking" algorithm (step 511). The switch 12 supports up to 3 independent trunks, each of which can consist of two to four ports. The 10/100 Mbs ports are divided into three trunk blocks consisting of ports 1–4, ports 5–8, and ports 9–12. Within each trunk block any two to four adjacent ports, for example, can be combined into one trunk. The purpose of sing is to load balance across the trunk ports. If the DA look engine 105 determines that a frame should be transmitted through a port that is part of a trunk, the IRC 40 performs a calculation (the trunk mapping function) on the frame's address fields to determine which of the trunk links to use. This may result in a frame being forwarded through a port that is different from the port indicated by the DA lookup engine 105. If any of the bits that are set in the port vector corresponds to a trunk port, the IRC 40 masks out all bits that correspond to ports in that trunk and then sets the bit corresponding to the port selected by the trunk mapping function. In other words, the IRC 40 masks the port vector to account for redirecting the frame according to the trunking algorithm.

Steps 513, 515, and 517 execute the VLAN ingress rules check. In particular, the ingress rules engine 105 checks the VLAN member set for each output port. The IRC 40 examines the bit that corresponds to the frame's VLAN index in the VLAN member set table entry that corresponds to the output port, per step 513. If this bit is not set, the IRC 40 accordingly masks that port from the port vector (step 515). This check is performed for every port that is set in the port vector; as in step 517, the IRC 40 checks whether the bit that is being checked corresponds to the last port in the port vector. Step 517 essentially ensures that the IRC 40 checks every bit of the port vector.

The ingress rules engine 105 provides a "sniffer port", which allows a probe connected to a port to monitor network activity on the other ports. Accordingly, steps 517 and 521 account for the sniffer port in the port vector. This sniffer port may be any port within the switch 12. The sniffed ports may be any port except the port associated with management queue 68.

The remaining steps of FIG. 5 involve the generation of the other fields of the forwarding descriptor. In step 523, the IRC 40 maps the VLAN index to the VLAN ID and inserts it into the forwarding descriptor. Next the IRC 40 determines whether an overflow (OVFL) descriptor exists, per step 525. If an OVFL descriptor exists, the IRC 40 immediately sends the OVFL descriptor to the PVF 56, per step 527. Otherwise, the IRC 40 sends the forwarding descriptor to PVF 56 (step 529).

Figure 6:
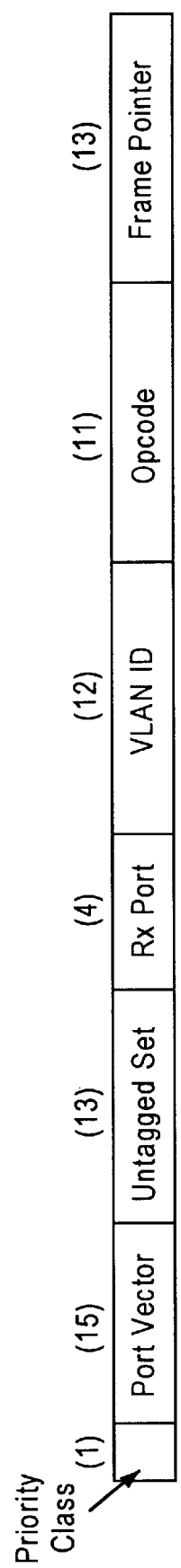
FIG. 6 is a diagram showing the format of the forwarding descriptor according to an embodiment of the present invention.

An exemplary format of a forwarding descriptor is shown in FIG. 6. The first field is a 1-bit priority class field, which indicates priority of the output queues to which the frame pointer should be sent. As previously indicated, the 15-bit port vector field is a bit map that specifies the port or ports designated to transmit the frame. The forwarding descriptor also contains, in one embodiment, a 4-bit receive port field that indicates the particular port within the switch 12 from which the frame was received. Another field includes a 12-bit VLAN ID that is associated with the frame; the dequeuing logic 76 may have to create a VLAN tag header with this identifier. In addition, the forwarding descriptor includes an operation code (opcode) field, which is 11-bits in length. The opcode field contains instructions that are used by the PVF 56 and the dequeuing logic 76 to determine operations that need to be performed on the frame before transmission. The opcode also has information used by management software to determine why a frame was forwarded to the management queue 68. Lastly, the forwarding descriptor has a 13-bit frame pointer field; this field provides the location of the frame in external memory 36.

As described above, the system and method for generating a forwarding descriptor in a network interface device utilizes logic engines 101, 103, 105, and 107, which are designed as separate logic devices and are able to process data frames independently. For example, the egress rules engine 107 may process a first frame while the DA lookup engine 105 is processing a second frame, the SA lookup engine 103 is processing a third frame and the ingress rules engine 101 is processing a fourth frame. This concurrent operation advantageously reduces switch latency. In addition, the throughput of the disclosed switch, which employs a pipelined architecture for its rules checker logic is increased largely as a result of a reduction in the number of clock cycles associated with the generation of the forwarding descriptor. Another advantage of the invention is that the modular architecture of the IRC 40 enables changes to be made to one of the logic engines without affecting the other logic engines. For example, when changes to the ingress rules engine 101 are desired, the changes may be made without causing corresponding changes to any of the engines 103, 105 or 107. Accordingly, the desired changes may be made in an efficient manner while minimizing the complexity of the changes.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A multiport switch configured for processing a data frame, comprising:
   a plurality of ports for outputting the data frame; and
   rules checker logic configured for generating in a pipeline manner a forwarding descriptor, the rules checker logic comprising a destination address engine for outputting a port vector that selectively maps a destination address of the data frame to one or more of the ports and wherein the rules checker logic further comprises an ingress rules engine, a source address lookup engine, and an egress rules engine; the ingress rules engine, the source address lookup engine, the destination address engine, and the egress rules engine being pipelined to process a different respective data frame simultaneously;
   wherein the rules checker logic is configured to modify the port vector to output the forwarding descriptor, the forwarding descriptor comprising the modified port vector.

2. The multiport switch as in claim 1, wherein the rules checker logic is configured to modify the port vector by modifying the port vector based upon:
   performing a spanning tree check;
   determining whether the data frame was received via the one of the ports;
   determining whether the data frame was received via a last cascade port;
   executing a trunk algorithm to load balance among a portion of the plurality of ports;
   performing a VLAN egress rules check; and
   determining whether the one or more of the ports is a sniffer port.

3. The multiport switch as in claim 1, wherein the rules checker logic further comprises an ingress rules engine that is configured to receive a frame header including a source address and a destination address of the frame and to determine whether the frame was received with errors.

4. The multiport switch as in claim 1, wherein the rules checker logic further comprises a source address lookup engine that is configured to search an address table for an entry whose address and virtual local area network (VLAN) index match a source address and VLAN index of the data frame.

5. The multiport switch as in claim 1, wherein the rules checker logic further comprises an egress rules engine that is configured to determine whether the one or more of the ports belongs to a VLAN member set.

6. The multiport switch as in claim 1, wherein the forwarding descriptor further comprises an operation code that indicates a method of modifying the data frame, the operation code being modified by port logic based upon the forwarding descriptor.

7. The multiport switch as in claim 6, further comprising dequeuing logic for executing the modified operation code.

8. The multiport switch as in claim 1, further comprising a memory for storing the data frame;
   wherein the forwarding descriptor further comprises an untagged set field indicating which ports should remove a VLAN tag header before transmitting the data frame, and a frame pointer field indicating location of the data frame in the memory.

9. A method of forwarding a data frame in a switching system having a plurality of ports for outputting the data frame, the method comprising the steps of:
   generating a port vector based upon a destination address of the data frame, the port vector designating one or more of the plurality of ports to transmit the data frame;
   masking the port vector to selectively add or remove port designations for transmission wherein the step of masking is based upon the steps of:
   performing a spanning tree check,
   determining whether the data frame was received via the one or more ports,
   determining whether the data frame was received via a last cascade port,
   executing a trunk algorithm to load balance among a portion of the plurality of ports,
   performing a VLAN egress rules check, and
   determining whether the one or more of the ports is a sniffer port; and
   outputting in a pipeline manner a forwarding descriptor that comprises the masked port vector.

10. The method as in claim 9, wherein the steps are performed by rules checker logic.

11. The method as in claim 10, wherein the rules checker logic comprises an ingress rules engine, that is configured to execute the steps of:

receiving a frame header including a source address and a destination address of the frame;

determining whether the frame was received with errors.

12. The method as in claim 10, wherein the rules checker logic comprises a source address lookup engine that is configured to execute the step of searching an address table for an entry whose address and virtual local area network (VLAN) index match a source address and VLAN index of the frame.

13. The method as in claim 10, wherein the rules checker logic comprises an egress rules engine that is configured to execute the step of determining whether the one or more of the ports belongs to a VLAN member set.

14. The method as in claim 10, wherein the rules checker logic comprises an ingress rules engine, a source address lookup engine, and an egress rules engine; the ingress rules engine, the source address lookup engine, the destination address engine, and the egress rules engine being pipelined to process a different respective data frame simultaneously.

15. The method as in claim 9, wherein the forwarding descriptor further comprises an operation code that indicates a method of modifying the data frame, the operation code being modified by a port logic based upon the forwarding descriptor.

16. The method as in claim 9, wherein the forwarding descriptor further comprises an untagged set field indicating which should remove a VLAN tag header before transmitting the data frame, and a frame pointer field indicating location of the data frame in a memory of the multiport switch.

* * * * *